Sept. 7, 1965 G. H. McMEEN 3,204,344
APPARATUS FOR TEACHING DIVISION BY FRACTIONS
Filed July 18, 1963
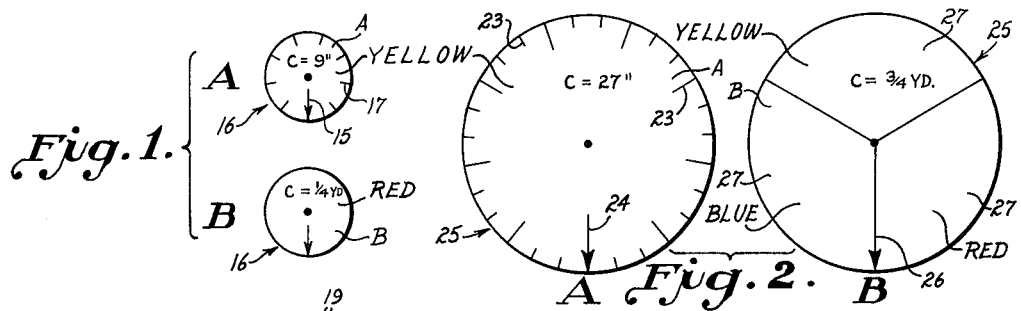
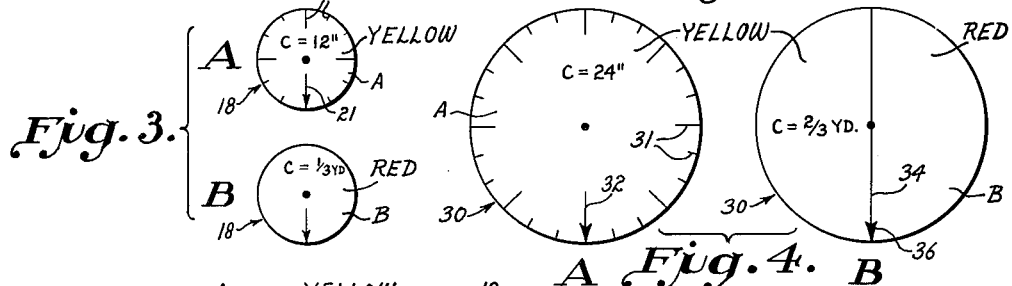
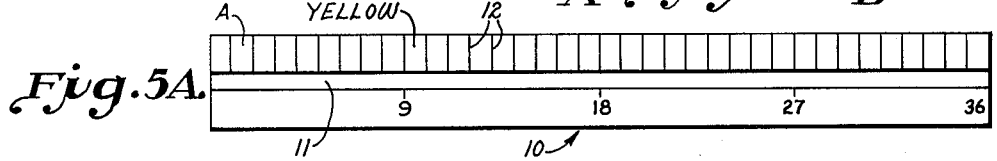
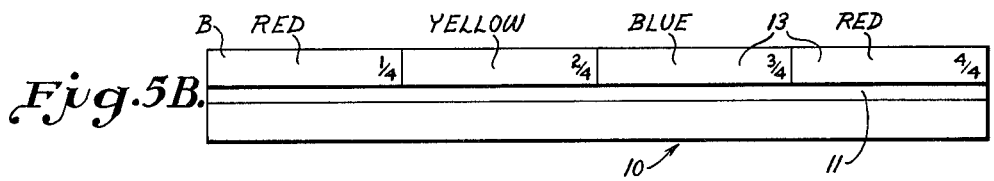
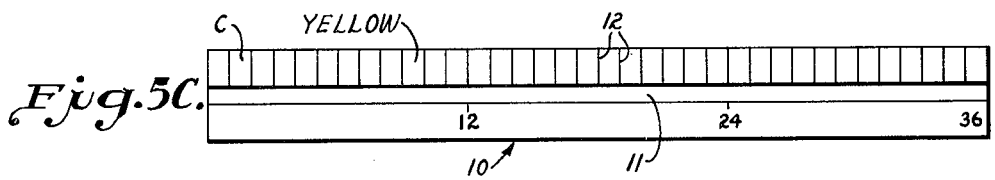
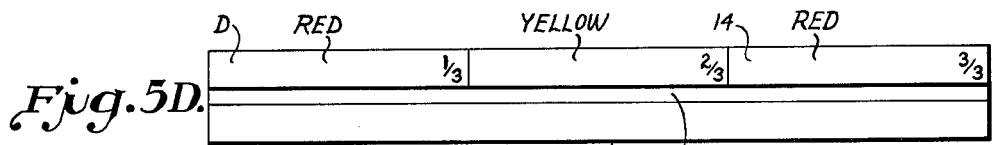
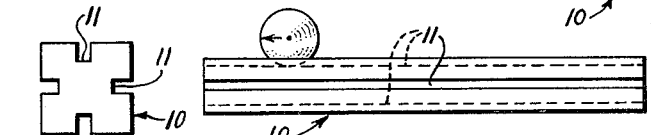
INVENTOR.
GEORGE H. McMEEN
BY
H W Brelaford
ATTORNEY

United States Patent Office 3,204,344
Patented Sept. 7, 1965

3,204,344
APPARATUS FOR TEACHING DIVISION
BY FRACTIONS
George H. McMeen, 18 Hathway Ave.,
San Luis Obispo, Calif.
Filed July 18, 1963, Ser. No. 295,882
3 Claims. (Cl. 35—31)

My invention relates to teaching aids and has particular reference to mechanical apparatus for visual demonstration for teaching division by fractions.

One of the most difficult arithmetic operations to teach is the division of a number by a fraction. In this operation the fraction is inverted and the number is multiplied by the inverted fraction. This is a seemingly illogical step to nearly all grade school children. Some text books have attempted to give a rational explanation for this operation, but invariably the written explanation is difficult to get across to the children. The result is that most teachers present the operation as a rule to be memorized and do not try to justify this inversion and then multiplication upon demonstrable logic. The unfortunate result is that most persons do not inquire behind the rule and carry this memory work into adulthood without any real understanding of the operation.

I have attempted visual demonstration of teaching aids so that the students would obtain an understanding solution of the basic question which is: how many of the particular fraction can go into the number in question. Originally I used sticks of various lengths to illustrate division by a measurement technique and found them quite effective. However, I found that my students using the sticks were prone to make a mistake in the size of the left over dimensions. For example, in measuring a stick one foot long with a stick three-fourths of a foot long, the students were likely to state that the three-fourths foot stick was contained one and one-fourth times in the one foot stick, not clearly perceiving that the remainder of one fourth of a foot was actually one third of the stick that was three-fourths of a foot in length.

To obviate these and other difficulties I have devised a teaching aid wherein the number to be divided (the dividend) is represented by a stick and the fraction by which it is divided is represented by a wheel. The wheel is divided into sectors depending upon the numerator of the fraction used, three sectors for three fourths, one for one fourth, etc. The stick may be marked with lineal dimensions that are equal to the arc length of the wheel sectors. The wheel is then rolled along the stick and the matching of periphery sector marks with the lineal stick marks gives a vivid portrayal of the relationship of dividend to fractions. At present I prefer a simple disc wheel. The use of wheels sculptured on a many sided figure would, of course, give rise to a large number of usable fraction "wheels" in a single mechanism. Also I have found that using a many sided stick with different lineal marking on each side gives rise to a variety of demonstrations with a single stick.

It is therefore a general object of my invention to provide an improved teaching aid for teaching division by fractions.

Another object of my invention is to provide a teaching aid for division by fractions wherein a wheel rotates on a straight member.

Another object is to provide a plurality of fraction divisors relative to a single dividend representation.

Other objects and advantages of my invention will be apparent in the following description and claims considered together with the accompanying drawings forming an integral part of this specification and in which:

FIG. 1 is a two-part view in elevation of a wheel embodying the invention to illustrate division by one-fourth, FIG. 1A showing one side and FIG. 1B the other.

FIG. 2 is a two-part view in elevation of a wheel embodying the invention to illustrate division by three-fourths, FIG. 2A showing one side and FIG. 2B the other.

FIG. 3 is a two-part view in elevation of a wheel embodying the invention to illustrate division by one-third, FIG. 3A showing one side and FIG. 3B the other.

FIG. 4 is a two-part view in elevation of a wheel embodying the invention to illustrate division by two-thirds, FIG. 4A showing one side and FIG. 4B the other.

FIG. 5A is an elevation view of one face of a four sided ruler embodying the invention.

FIG. 5B is an elevation view of another of the four faces of a ruler embodying the invention.

FIG. 5C is an elevation view of a third face of a fourth side of a ruler embodying the invention.

FIG. 5D is an elevation view of the fourth face of a four sided ruler embodying the invention.

FIG. 6 is an end view of the ruler having the four faces of FIGS. 5A through 5D, and FIG. 7 is an elevation view on a reduced scale of the ruler of FIG. 6 showing a wheel placed on the ruler.

Referring to the drawings, the wheels which are illustrated in FIGS. 1 through 4 are the divisors, and the straight ruler which is illustrated in FIGS. 5, 6, and 7 acts as the dividend, and the number of turns of the wheel to travel the length of the ruler is the quotient.

Referring especially to FIGS. 5, 6 and 7, a straight stick 10 has four sides, A, B, C, and D, each of which is illustrated in FIGS. 5A, 5B, 5C, and 5D respectively. Each face has a groove 11 formed therein to act as a track in which the wheels of FIGS 1 to 4 may roll. It will be noted that the faces of FIGS. 5A and 5C are divided by marks 12 into a large number of even lengths and for purposes of illustration, 36 spaces are marked off. Thus it is convenient to use a stick one yard long and mark off spaces which are one inch in length. Face B is divided into four equal spaces 13 (each 9 inches long) preferably of varying colors: red, yellow, blue and red. Face D of FIG. 5D is divided into three equal spaces 14 (each 12 inches long) and are preferably of contrasting colors: red, yellow and red.

The wheels of FIGS. 1 through 4 have varying diameters to give peripheries or circumferences of varying lengths. In FIG. 1, the wheel represents one-fourth yard of circumference; FIG. 3 represents one-third yard; FIG. 4 represents two-thirds yard, and FIG. 2 represents three-fourths yard.

In FIG. 1 a wheel 16 has a diameter such that it results in a perimeter of 9 inches or one-fourth yard and accordingly raidal marks 17 create nine equal spaces on its perimeter of face A. Face A is preferably yellow in color. One of the radial marks is designated with an arrow 15 to act as the starting mark for rotation of the wheel. Face B is preferably red in color and has but a single radial mark indicating that this face of the wheel 16 is not subdivided. In FIG. 3, a wheel 18 is of such diameter that its perimeter is 12 inches or one-third yard and one face A may have its perimeter divided into twelve equal spaces by radial marks 19. A reference arrow 21 may act as one space marker and every third marker 19 may be elongated.

In FIG. 2, a wheel 25 has a diameter such that its perimeter is 27 inches and radial marks 23 on one face A divide this periphery into twenty-seven spaces. A reference arrow 24 marks one such space and every third radial mark 23 thereafter is longer. Face A is preferably yellow. An oposite face, B is divided into three equal sectors 27 each of which may be differently colored; for example, yellow, red and blue. One sector line incorporates a reference arrow 26 dividing the blue and red sectors.

In FIG. 4, a wheel 30 has a diameter such that its circumference and perimeter is 24 inches or two-thirds yard, and accordingly a face A may have radial marks 31 that divide off 24 equal spaces. A reference arrow 32 may be placed on one radial mark 31 and every third mark thereafter may be longer. Face A may be yellow. An opposite face B may have a diameter mark 34 thereon with an arrow 36 at one end to act as a reference. One semi-circle or half-sector may be red to the left of the arrow, and the other yellow.

Before attempting to solve problems with my teaching aid, the teacher should first demonstrate the materials to the students. The handling of the wheels is facilitated by a handle and I have found that an ordinary flat head nail passed through the center of a wheel will enable the teacher to hold the wheel in place as well as rotate it. Accordingly, the head end of the nail is toward the pupils. The teacher may rotatae wheel 16 on the groove 11 of the ruler 10 as shown in FIG. 7 and demonstrate that it takes four revolutions to travel the length of the ruler. If wheel face A is toward the pupils and rule face A is used (by placing the wheel in track 11) it is quickly demonstrated that the nine spaces on the circumference of wheel 16 (FIG. 1A) match in length those of ruler face A (FIG. 5A) and that the rotations come out even; that is: four times 9 is 36. Likewise, the teacher can demonstrate that large wheel 18 (FIG. 3) has a circumference of 12 inches and thus will rotatae three times on ruler 10. In a similar fashion wheel 25 (FIG. 2) being 27 inches rotates 1 and ⅓ times and wheel 30 (FIG. 4) being 24 inches rotates one and ½ times.

The purpose of my apparatus is to demonstrate visually the reason for inverting the fraction when a number (dividend) is divided by a fraction (divisor). For this purpose only the B faces of the wheels are used. The teacher poses the problem: how many times does one fourth go into one, or what is the quotient of 1 divided by one-fourth? Wheel 16 is used to solve this problem. Face B of wheel 16 (FIG. 1B) having a circumference of 9 inches is the ¼ yard wheel. With face B of wheel 16 toward the pupils, the wheel is rolled on any face of roller 10 and four revolutions will be counted. The solution will be one multiplied by 4. The manner in which the quotient is obtained will be readily apparent; that is, it is obtained by multiplying the number of rotations by the dividend one, and the only way in which to accomplish this is to invert the fraction and multiply.

To divide by ⅔, the 24 inch or ⅔ yards wheel is selected, wheel 30 (FIG. 4). This wheel is rotated on face D of rule 10 and the arrow 36 is registered with the left end of that face D. It will be observed that this wheel 30 rotates 1 and ½ times, especially if face B is toward the pupils. The matching wheel and rule colors of red, yellow, and then red clearly show the left over remainder of ½ after one full rotation. Again the relationship of inverting and multiplying is observed of one times ³⁄₂.

To divide by ¾, the 27 inch or ¾ yard wheel 25 is selected and face B may be placed toward the pupils. This wheel is rolled on face B of ruler 10 and the colors will match while rolled from left to right, coming up with the clear answer of 1 and ⅓ turn. This demonstrates the solution to accurately determining the left over fractions which pupils found so difficult with sticks. The one third rotation (red sector) after one complete rotation 16 is clearly marked by these colored sectors.

Similarly the one third yard wheel 18 of FIG. 3 can be used to demonstrate division by thirds.

In this fashion the logic of multiplying the inverted fractions is demonstrated, leaving a lasting impression on the pupil, but more importantly, giving the pupil a pictorial representation of what takes place. There is thus a basis in logic established for this multiplication and inverting operating and the student will naturally fall back to the operation even if he forgets the rule.

While only a limited number of examples can be demonstrated on the apparatus illustrated, I find they are sufficient to establish the principle for pupils. There is, of course, no limit to the number of different sizes of wheels that can be used nor is there any limit to the length of ruler or the variety of colors or markings on the ruler. The apparatus described is suitable for a classroom teacher, and if individual students' sets are made, they of course will be smaller in size.

Various modifications will occur to those skilled in the art. For example, dividend integers greater than one can be represented by ruler sections of different color. Various fractions can be indicated by wheels having sectors colored to represent these fractions, and the number of "rotations" of that particular fraction can be observed. Accordingly, I do not limit myself to the particular apparatus illustrated or described, but claim as my invention all variations and modifications that fall within the true spirit and scope of my invention.

I claim:
1. Teaching apparatus for demonstrating division by fractions comprising:
   (a) a ruler having at least one face and having a length representing a selected numerical dividend;
   (b) a plurality of wheels, each having a different circumference equal to a different fractional length of the ruler;
   (c) indicia on each wheel representing the particular fractional length of said ruler; and
   (d) means on the ruler engageable with the wheels to enable the wheels to be individually rotated along the ruler length to demonstrate the fractional values represented by the wheels.
2. Teaching apparatus as set forth in claim 1 wherein at least one face of the ruler is divided into several spaces of equal length each having a different color, and at least one wheel is divided into sectors the circumferential length of which is equal to the length of the ruler spaces, and the colors of the sectors match the color of the ruler spaces, to provide a color visualization of fractional representation as the wheel is rotated along the ruler.
3. Teaching apparatus for demonstrating division by fractions comprising:
   (a) a ruler having a length representing a selected numerical dividend and having a cross section that permits a wheel to be rotated along the length of the ruler;
   (b) a plurality of wheels, each having a different circumference equal to a different fractional length of the ruler, and each constructed for rotation along the length of said ruler; and
   (c) indicia on the wheels representing the particular fractional length of said ruler,
whereby rotation of the wheels individually along the ruler visually represents the fractional value of each wheel.

References Cited by the Examiner

UNITED STATES PATENTS

| | | | |
|---|---|---|---|
| 342,651 | 5/86 | Southworth | 35—70 |
| 346,368 | 7/86 | Honeycutt | 33—107 |
| 616,943 | 1/99 | La Due | 33—109 |
| 2,705,843 | 4/55 | Hawkins | 35—31 |

EUGENE R. CAPOZIO, *Primary Examiner.*

LAWRENCE CHARLES, *Examiner.*